(12) United States Patent
Zilberman

(10) Patent No.: US 9,679,496 B2
(45) Date of Patent: Jun. 13, 2017

(54) REVERSE LANGUAGE RESONANCE SYSTEMS AND METHODS FOR FOREIGN LANGUAGE ACQUISITION

(71) Applicant: Arkady Zilberman, Powell, OH (US)

(72) Inventor: Arkady Zilberman, Powell, OH (US)

(*) Notice: Subject to any disclaimer, the term of this patent is extended or adjusted under 35 U.S.C. 154(b) by 119 days.

(21) Appl. No.: 13/690,984

(22) Filed: Nov. 30, 2012

(65) Prior Publication Data

US 2013/0143183 A1 Jun. 6, 2013

Related U.S. Application Data

(60) Provisional application No. 61/565,698, filed on Dec. 1, 2011.

(51) Int. Cl.
*G09B 19/06* (2006.01)
*G09B 19/08* (2006.01)
*G09B 5/06* (2006.01)

(52) U.S. Cl.
CPC .............. *G09B 19/08* (2013.01); *G09B 5/06* (2013.01)

(58) Field of Classification Search
CPC ....................................................... G09B 19/06
USPC ........................................................ 434/157
See application file for complete search history.

(56) References Cited

U.S. PATENT DOCUMENTS

| 5,010,495 | A | * | 4/1991 | Willetts | ................ | G09B 5/04 |
| | | | | | | 434/167 |
| 5,215,466 | A | | 6/1993 | Rubio | | |
| 5,430,827 | A | | 7/1995 | Rissanen et al. | | |
| 5,717,828 | A | | 2/1998 | Rothenberg et al. | | |
| 6,134,529 | A | | 10/2000 | Rothenberg | | |
| 6,146,147 | A | | 11/2000 | Wasowicz et al. | | |
| 6,224,383 | B1 | | 5/2001 | Shannon | | |

(Continued)

FOREIGN PATENT DOCUMENTS

| JP | 11154152 A | 6/1999 |
| RU | 2276612 C2 | 5/2006 |
| TW | 201143367 A | 12/2011 |

OTHER PUBLICATIONS

Jonathan Brody; Innovation of Self-Instruction:EFL Magazines in Taiwan; pp. 1-10; ISSN 1176-7480 Manukau Institute of Technology, Auckland, Sep. 2005.

(Continued)

*Primary Examiner* — Robert J Utama
*Assistant Examiner* — Elroy S Crocker
(74) *Attorney, Agent, or Firm* — Dinsmore & Shohl LLP

(57) ABSTRACT

Reverse Language Resonance methods are described for instructing a target language to a learner who speaks a native language. The methods may include providing to the learner a predetermined lesson comprising a lesson text of a plurality of lesson words that are exclusively in the target language. The methods may further include priming implicit memory of the learner. The methods may further include displaying the lesson text on a display and playing a recorded version of spoken words of the lesson text on an audio output while the lesson text is displayed. The methods may further include instructing the learner to perform Concurrent Triple Activity including simultaneously reading the lesson text on the display, listening to the spoken words from the audio output, and repeating the spoken words along with the recorded version into an audio input while the recorded version is playing.

8 Claims, 9 Drawing Sheets

(56) References Cited

U.S. PATENT DOCUMENTS

| | | | |
|---|---|---|---|
| 6,305,942 B1 | 10/2001 | Block et al. | |
| 6,341,958 B1 * | 1/2002 | Zilberman | 434/157 |
| 6,370,355 B1 | 4/2002 | Ceretta et al. | |
| 6,726,486 B2 * | 4/2004 | Budra et al. | 434/169 |
| 6,859,211 B2 | 2/2005 | Friedlander | |
| 7,062,441 B1 * | 6/2006 | Townshend | 704/270 |
| 7,149,690 B2 | 12/2006 | August et al. | |
| 7,257,366 B2 | 8/2007 | Maldonado et al. | |
| 7,273,374 B1 | 9/2007 | Abbey | |
| 7,367,885 B2 * | 5/2008 | Escalera et al. | 463/32 |
| 7,401,018 B2 | 7/2008 | Yamada et al. | |
| 7,409,348 B2 | 8/2008 | Wen et al. | |
| 7,524,191 B2 * | 4/2009 | Marmorstein | G09B 7/00 434/157 |
| 7,542,908 B2 | 6/2009 | Segond | |
| 7,563,099 B1 * | 7/2009 | Iftikhar | G09B 19/04 434/156 |
| 7,587,306 B2 | 9/2009 | Teytaud et al. | |
| 7,648,366 B1 * | 1/2010 | Poulsen | 434/236 |
| 7,689,407 B2 * | 3/2010 | Yang et al. | 704/3 |
| 7,752,534 B2 * | 7/2010 | Blanchard, III | G06F 17/22 715/201 |
| 7,818,164 B2 | 10/2010 | Wood et al. | |
| 7,869,988 B2 | 1/2011 | Wood et al. | |
| 8,457,967 B2 * | 6/2013 | Audhkhasi et al. | 704/254 |
| 2003/0157468 A1 | 8/2003 | Kasahara | |
| 2007/0294082 A1 | 12/2007 | Jouvet et al. | |
| 2009/0044686 A1 * | 2/2009 | Vasa | 84/609 |
| 2010/0211376 A1 | 8/2010 | Chen et al. | |
| 2010/0304342 A1 * | 12/2010 | Zilber | 434/157 |
| 2011/0040562 A1 | 2/2011 | Doyle et al. | |
| 2011/0053123 A1 | 3/2011 | Lonsdale | |
| 2012/0065977 A1 | 3/2012 | Tepperman et al. | |
| 2012/0115112 A1 * | 5/2012 | Purushotma et al. | 434/157 |
| 2012/0115113 A1 | 5/2012 | Shin | |
| 2013/0002656 A1 | 1/2013 | Zhang | |

OTHER PUBLICATIONS

William D. Marslen-Wilson; Speech Shadowing and Speech Comprehension; Speech Communication vol. 4 Aug. 1985, pp. 55-73 North Holland.

International Search Report and Written Opinion dated Jul. 25, 2013, pertaining to International Patent Application No. PCT/US2013/020634.

* cited by examiner

| 1. introduction | 1. 介绍 |
|---|---|
| 2. main | 2. 主 |
| 3. characters | 3. 字符 |
| 4. great | 4. 大 |
| 5. meet | 5. 满足 |
| 6. you | 6. 您 |
| 7. person | 7. 人 |
| 8. agree | 8. 同意 |
| 9. after | 9. 后 |
| 10. our | 10. 我们的 |
| 11. long | 11. 长 |
| 12. talk | 12. 谈 |
| 13. nice | 13. 尼斯 |
| 14. see | 14. 见 |
| 15. happy | 15. 快乐 |
| 16. hear | 16. 听 |
| 17. that | 17. 该 |
| 18. have | 18. 有 |
| 19. decided | 19. 决定 |
| 20. improve | 20. 改善 |
| 21. your | 21. 您的 |
| 22. English | 22. 英语 |
| 23. Many | 23. 许多 |
| 24. Chinese | 24. 中国的 |
| 25. can | 25. 可以 |
| 26. write | 26. 写 |
| 27. read | 27. 阅读 |
| 28. but | 28. 但 |
| 29. few | 29. 少数 |
| 30. speak | 30. 发言 |

| 31. fluently | 31. 流利地 |
|---|---|
| 32. know | 32. 知道 |
| 33. hope | 33. 希望 |
| 34. find | 34. 发现 |
| 35. better | 35. 更好 |
| 36. way | 36. 方法 |
| 37. become | 37. 成为 |
| 38. fluent | 38. 流利 |
| 39. also | 39. 还 |
| 40. impressed | 40. 留下深刻印象 |
| 41. come | 41. 来 |
| 42. must | 42. 必须 |
| 43. very | 43. 很 |
| 44. interesting | 44. 有趣 |
| 45. foreigner | 45. 外国人 |
| 46. since | 46. 自 |
| 47. language | 47. 语 |
| 48. culture | 48. 文化 |
| 49. different | 49. 不同 |
| 50. from | 50. 从 |
| 51. your | 51. 您的 |
| 52. was | 52. 是 |
| 53. always | 53. 总是 |
| 54. fascinated | 54. 着迷 |
| 55. with | 55. 同 |
| 56. believe | 56. 相信 |
| 57. understand | 57. 理解 |
| 58. should | 58. 应该 |
| 59. learn | 59. 学习 |
| 60. sometimes | 60. 有时 |
| . . . | . . . |
| XX. bye | XX. 再见 |

FIG. 3

| | |
|---|---|
| Drill 1 | Read the text in your native language without pronouncing the words and try to visualize the story given. |
| Drill 2 | Repeat aloud the recorded text, using earphones, while speaking along with the speaker with a delay of one or two words. While doing this, follow the English text with your eyes and imagine that you are participating in the situation. Do not pay attention to the details. |
| Drill 3 | Continue repeating the recorded text concurrently with the speaker many times until you can do it easily and without omissions. Then do a few more repetitions, this time with your eyes closed. Do not analyze your own pronunciation. |
| Drill 4 | Continue repeating the recorded text concurrently with the speaker but this time type in the opened window any words that you recognize without stopping the recording. Repeat this drill a few times until the number of typed words in the Note is more than 20. |
| Drill 5.1 | Repeat this paragraph a few times with increasing speed.<br><br>"English became the global language<br>and on this ground loses any<br>connection to any particular culture" |
| Drill 5.2 | Read the paragraph as fast as possible, as if it were complete:<br><br>"English became the ... ...<br>and on this ground ... any<br>connection to any ... ... ." |
| Drill 6 | Repeat the garbled paragraph a few times (pronouncing it as if written correctly):<br><br>"Enlgsih bceame the golabl lnagauge<br>and on this gruond loses any<br>cnnoetcion to any paritcluar cluture."<br><br>Don't be discouraged if at first it is hard for you to read this garbled paragraph. This exercise will improve your fast reading and visualization skills. |

FIG. 6A

| | |
|---|---|
| Drill 7 | One Man Show<br><br>Complete the word blocks given below and act out the scenes, using your dominant senses (vision, hearing, taste, etc.); your answers will be automatically recorded. In acting out each scene, you may choose to be an actor, a singer, a dancer, a stage director, or an artist. Use the word blocks from the current or previous lessons to work through the scenes.<br><br>1. It is nice to see ...<br>2. ... can write and ...<br>3. ... a better way to become ...<br>4. That must be not ...<br>5. Sometimes I think ...<br>6. English became the global ...<br>7. It is an interesting ...<br>8. ... cultural aspects about ...<br>9. It sounds ...<br>10. I am very ... |
| Drill 8 | Surprise drill.<br><br>Research the following topic: "How to improve memory?"<br><br>Research the topic and write a short essay (up to 100 words for lessons 1-10 and up to 200 words for lessons 11-20) on the topic and copy and paste the essay into the new screen window.<br><br>Repeat the text of the essay while listening to the text-to-voice program and speaking simultaneously with the robot.<br><br>When a learner completes the repetition without omissions or mistakes, the program suggests making the last repetition of the text – this time without listening to the robot.<br><br>The learner's reading is recorded and the learner is given the choice of sharing it via social networking or attaching it to an email in case of blended learning. |

FIG. 6B

| | |
|---|---|
| Drill 9 | Read aloud the text of the lesson without listening to the recording. Your reading will be recorded automatically.<br><br>If you are satisfied with your reading, press the Upload button and your last recording will be sent to the internal memory (or external SD card) of your smart phone and can be selected later for sharing via social-networking or attached to an email for blended learning. |
| Drill 10 | Testing active vocabulary.<br>Look at the bottom screen that displays a word. Now use that word in one or two sentences describing something from your own experience, sparked off by a word on the bottom screen. Click Next button to see the next testing word.<br>Repeat this for 10 words or more.<br><br>After producing sentences for ten words, two buttons appear on the screen: Continue and Complete.<br>Clicking the first button the learner continues testing; clicking on the second button ends the testing and learner has the option to share the recorded testing sentences with the social network of his choice, or to email it to a teacher or server for evaluation in case of blended learning. |

FIG. 6C

REVERSE LANGUAGE RESONANCE SYSTEMS AND METHODS FOR FOREIGN LANGUAGE ACQUISITION

CROSS-REFERENCES TO RELATED APPLICATIONS

This application claims the benefit of priority under 35 U.S.C. §119(e) to U.S. Provisional Application Ser. No. 61/565,698, filed Dec. 1, 2011, the entirety of which is incorporated herein by reference.

TECHNICAL FIELD

The present specification is directed to systems and methods for learning foreign languages, teaching foreign languages, or both, and, more particularly, to systems and methods for facilitating the teaching of foreign languages or the learning of foreign languages by invoking a learner's subconscious and conscious minds simultaneously.

BACKGROUND

The grammar-translation method is an academic approach to language learning that has been central to language teaching throughout the ages and is still valid today. Generally, the grammar-translation method requires learners to translate written passages (usually word for word) based on consciously memorized grammatical rules and vocabulary lists. Most conventional methods of learning foreign languages, in spite of sometimes new names and some cosmetic changes, still are founded on the main characteristics of grammar-translation approach and are inefficient.

Foreign-language learning is very different from other kinds of learning. The habits and methods used to learn math, science, or history typically do not apply to learning foreign languages. Most conventional foreign language learners consciously studied the mechanics of their new language as though the language were a car. They cut up the new language with their mind and then studied the parts word by word, rule by rule. Yet, learning words or phrases by constantly mentally translating into a native language creates extra steps in a person's brain during simple communication that are not performed when a native language is spoken.

Learning from vocabulary lists or flashcards may encourage learners to exclusively use one-to-one translation. When learning a foreign-language word by translating into the native language, the foreign word and the native word are bound together in the learner's mind as a pair, creating an illusion that the learner will be able to speak fluently by taking separate words and sticking them together. But this idea is contrary to the mechanism of speech in a person's native language and in any other language for which a learner has acquired true fluency. Namely, speech involves expressing thoughts automatically by using collocations and word patterns that our brain is trained to produce without pausing to think or remember.

Learning grammar in one language and attempting to apply it in another also is disadvantageous, because bilingual information is stored in a memory for a limited time. Most of this type of information is erased from the mind after about 30 days, especially if it was not used in this period. Many post-graduate students who came to English-speaking countries to continue their education, even after passing intensive exams such as TOEFL or TOEIC, have complained of still being unable to express thoughts, to understand spoken language, or to follow vocational or academic lectures in the new language.

In view of the above background, there remain ongoing needs for systems and methods for teaching and learning foreign languages that allow adult learners to overcome the brain resistance to a second language on a subconscious level by silencing the mother tongue and eliminating subconscious cross-translation to and from the mother tongue.

SUMMARY

Exemplary embodiments herein may be directed to methods of Reverse Language Resonance for instructing a target language to a learner who speaks a native language. The methods may include providing to the learner a predetermined lesson comprising a lesson text of a plurality of lesson words that are exclusively in the target language. The methods may further include priming implicit memory of the learner for a predetermined period of time. The methods may further include displaying the lesson text on a display and playing a recorded version of spoken words of the lesson text on an audio output while the lesson text is displayed. The methods may further include instructing the learner to perform Concurrent Triple Activity while the lesson text is displayed on the display and the recorded version is played on the audio output. The Concurrent Triple Activity may include simultaneously reading the lesson text on the display, listening to the spoken words from the audio output, and repeating the spoken words along with the recorded version into an audio input while the recorded version is playing.

Other embodiments herein may be directed to systems incorporating the methods for instructing the target language. The systems may include computer-based systems, Internet-based applications, self-study systems, and collaborative learning systems, for example.

Still other embodiments herein may be directed to machine-executable methods for instructing a target language to a learner who speaks a native language or to machine-readable media containing instructions for executing the methods for instructing the target language.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 3 is an example embodiment of a word inventory contained in a word database for computer-based implementations of methods for instructing a foreign language according to embodiments herein;

FIGS. 6A-6C is a table describing ten exemplary drills that may be included in methods for instructing a foreign language according to embodiments herein.

DETAILED DESCRIPTION

Figure 1:
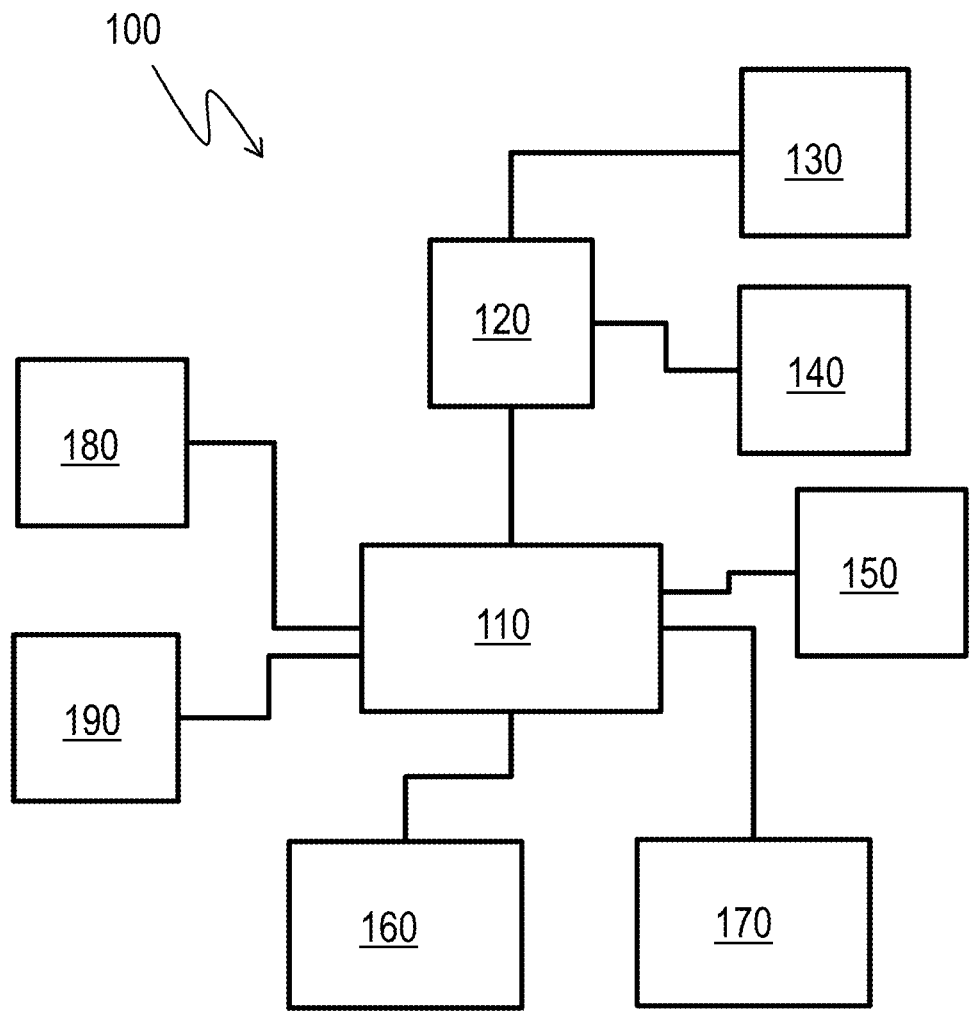
FIG. 1 schematically represents an exemplary client system suitable for computer-based use of methods for instructing a foreign language according to embodiments herein.

Embodiments described herein are directed to processes and concepts that may overcome the problems of conventional methods of learning foreign languages. In some embodiments, the processes and concepts are incorporated into systems and methods for teaching and learning a foreign language. In some embodiments, the systems and method for leaning a foreign language may be assisted by a computer or by machine-executable code executed by a computer connected to peripheral devices that facilitate the teaching or learning systems and methods. The embodiments may further include a machine-readable or electronic storage medium in communication with a database or processor, wherein the storage medium contains instructions that direct the processor of a computer, for example, to carry out any or all of the instructional steps described herein.

As used herein, the terms "foreign language" and "target language" may be used interchangeably to represent a language that a learner who speaks a native language desires to learn or acquire, but in which the learner is not yet fluent or desires greater fluency. A target language or foreign language may be the learner's second language, third language, or greater. A learner may have one or more than one native language acquired naturally by learning processes that begin at birth and are well understood. In all regards, as used herein, a "foreign language" or a "target language" refers generally to a language that is not already among the learner's one or more native languages.

Logic becomes a prevailing tool for acquiring information in adults starting at the age of 17. In general, logical consideration tells learners to compare new information to past experience. When logical learners study a foreign language, they subconsciously associate each new word with a similar word in their native language, not with the image or situation that the new word describes in the target language they are attempting to acquire. This subconscious activity is called cross-translation and acts as a formidable barrier in acquiring fluency in the target language. A learner who tries to think in the learner's mother tongue but speak in the target language encounters great difficulties because the brain protects its native tongue authority. Very few people can translate subconsciously from their mother tongue quickly enough to produce practical speech in a foreign language or to understand the foreign language when it is spoken by a native speaker.

Many psychologists believe that there are three main categories of learners: visual learners, auditory learners, and kinesthetic learners. Visual learners prefer seeing and reading; auditory learners prefer listening and speaking; and kinesthetic learners prefer touching and doing. It is believed that only a small portion of adults naturally avoid the "logical" path and are thereby preserve the auditory and visual learning styles, which happen to be the predominant learning styles of most children who are learning their native language. This small portion of adults can easily learn a new language by any method, because they operate in the one-language environment and avoid the ubiquitous problem of cross-translation.

However, most adults encounter difficulties in learning a foreign language for a variety of reasons. Some psychologists believe that the difficulties arise because the critical period for language learning ends by puberty, leaving adults with a brain too rigid to change its structure on a large scale. But the discovery of competitive plasticity suggests this may not be true. It is believed that as we age, the more we use our native language, the more it dominates our linguistic map space. Thus, it is also because our brain is plastic—and because plasticity is competitive—that it is so hard to learn a new language. The reason why learning a new language as one ages is more difficult is not because the brain cannot change itself. Rather, when a person ages, the native language has already dominated the linguistic map space. Adults must work harder than a child to master a new language, because the brain protects its native language authority.

Critical period in language development begins in infancy and ends between eight years and puberty. After the critical period closes, a person's ability to learn a foreign language and speak it without an accent is limited. A foreign language learned after the critical period is not processed in the same part of the brain as is the native tongue. If two languages are learned at the same time during the critical period, both languages establish a foothold. Brain scans show that in a bilingual child all the sounds of the child's two languages share a single large map, a library of sounds from both languages. On the other hand, bilingual adults who acquired fluency in adulthood possess two separate language centers in the brain.

In view of the above-noted difficulties to adults who desire to learn a foreign language, embodiments herein invoke a process called Reverse Language Resonance (RLR) to overcome problems such as cross-translation. In its many embodiments, Reverse Language Resonance includes processes of learning a foreign language by simultaneously reconstructing in conscious and subconscious memories various situations that are first described in both the learner's native language and a target language and thereafter are experienced exclusively in the target language. The experience in the target language may be derived from a series of lessons unified by a gradually developing plot. In some embodiments, the RLR process may be designed for self-study or for blended learning, such as by a combination of self-study and guided learning through online or offline classes. In some embodiments, online learning may be accomplished using a personal computer, a personal device such as a smart phone, or an Internet-based application. It is believed that the RLR process may aid adult learners to develop phonological awareness, to develop intuitive grammar, to improve pronunciation and imaginative memory, to activate left and right hemispheres of the brain in the process of acquisition of a foreign language, and to develop mental visualization abilities.

Thus, exemplary embodiments herein may be directed to methods of Reverse Language Resonance instructing a target language to a learner who speaks a native language. The methods may include providing to the learner a predetermined lesson comprising a lesson text of a plurality of lesson words that are exclusively in the target language. The methods may further include priming implicit memory of the learner for a predetermined period of time. The methods may further include displaying the lesson text on a display and playing a recorded version of spoken words of the lesson text on an audio output while the lesson text is displayed. The methods may further include instructing the learner to perform Concurrent Triple Activity while the lesson text is displayed on the display and the recorded version is played on the audio output. The Concurrent Triple Activity may include simultaneously reading the lesson text on the display, listening to the spoken words from the audio output, and repeating the spoken words along with the recorded version into an audio input while the recorded version is playing.

In some embodiments, the predetermined lesson may be provided on a display screen of a computer or personal device, for example, in written materials, or from a live teacher such as in a classroom setting or online learning setting via videoconference, for example. The predetermined lesson text includes a plurality of lesson words that are exclusively in the foreign language or target language. In some embodiments, the lesson text may include from about 50 lesson words to about 200 lesson words, or from about 60 lesson words to about 150 lesson words, or from about 80 lesson words to 140 lesson words, for example. In conventional language-learning programs, words may be provided in lists, with the learner's native language on one side and the target language on the opposite side and the learner may be instructed to memorize a foreign word that corresponds to a word in the native language. In contrast, in the embodiments herein, the learner does not see any word lists. In embodiments herein, the plurality of lesson words constitutes a word inventory, which may be tracked and maintained by a word database or the instructor for selectively presenting information during the RLR process. Also, in embodiments herein the word inventory is not based on words randomly selected from a dictionary, nor are the lesson words randomly chosen. Rather, the predetermined lesson may include a number of paragraphs, sentences, and phrases, for example, which are written into a coherent story that can be understood temporally, has a beginning and end with regard to events described in the coherent story, and which is made comprehensible because all lessons and drills are translated into the native language. As such, in embodiments herein, the plurality of lesson words may consist of each individual word in the coherent story. In this regard, the lesson words relate collectively to the coherent story, because they are derived from breaking up the coherent story into the all the words contained in the coherent story.

In some embodiments, the RLR process may include instructing a student or learner of a target language to use a Concurrent Triple Activity (CTA) process. The CTA process may include instructions to the learner to perform three actions simultaneously. The three simultaneous actions may include (1) silently reading a text; and (2) listening to a recorded version of the text in a listening device such as a headset; while (3) repeating the text aloud along with or as close as possible to the pace of the recording. Thereby, the RLR process is believed to invoke multiple senses and imaginative memory in a manner that is both flexible and adapted to any learning style. In combination with CTA performed exclusively in a foreign language, using the RLR process adult learners can develop phonological awareness and intuitive grammar, while also improving pronunciation and imaginative memory.

All languages of the world are built from a certain number of phonemes that allow creating of all words of the given language. For example, any spoken word in English language can be produced using one or more phonemes selected from a group consisting of only 45 phonemes. It is interesting to note that newborns respond to language sounds from any language, not just their own. However, by the age of one year, a baby's response to phonemes becomes more selective, in that the baby stops responding to phonemes that are absent from its own linguistic environment.

Unfamiliar sounds and sound combinations produce perceptual difficulties for adults struggling to learn a foreign language. To improve speech encoding, and ultimately, perception, there are two broad courses of action. The first is training. The auditory system has a remarkable ability to reorganize in response to training to cope with unfamiliar signals. The second is increasing signal clarity. Steps can be taken to increase the clarity of the signal, thereby shifting the burden of improving encoding outward.

Adults who begin learning a new language may find that they do not have the ability to recognize the phonemes of the new language. It is believed that the adults do not hear any basic sounds or phonemes of the new language. To develop the ability to recognize sounds and phonemes of a new language, adults need a special tool.

Reverse Language Resonance (RLR) is such a tool. In some manifestations, Reverse Language Resonance may occur when a learner performs speech shadowing or simultaneous repetition. For example, the learner may listen to recordings of lessons in a new language, in a headset for example, thereafter repeating the lessons as closely as possible to the narrator's recording while silently reading the same text. In this regard, the speech shadowing process is supplemented by visualizing the words in the text of the lesson while the learner hears and repeats aloud the recorded text. To ensure that learners not only listen to the recording but are actively engaged in speech shadowing or simultaneous repetition, in some embodiments RLR may be conducted by incorporating audio feedback modules that check that the headset is attached to the computer or multimedia device and that also check that the level of audio sound during repetition is at least above the middle of a sound input monitor on a multimedia device or a computer. The audio feedback, in turn, precludes passive listening and may ensure that learners are engaged in an active process of RLR.

In some embodiments, RLR may be used in combination with CTA so that the learner acquires the harmony and rhythm of a foreign language that were alien at the beginning of the process. The learner's brain then starts subconsciously analyzing the experienced situations looking for patterns. In some embodiments the ability to find patterns in a new language may be facilitated in the RLR process by using CTA of emotional recorded texts, whereby when learners listen to the emotional recorded texts they re-living a new situation in a new language as though they really were taking part in the situation. The ability of experiencing a comprehensible situation in the target language fuels the learner's motivation, because the learner is controlling the whole process of target language acquisition.

According to some embodiments, the RLR process may comprise a storage medium containing instructions directing a processor to instruct a learner to perform three actions simultaneously. As described above, the three actions may comprise (1) silently reading a text; and (2) listening to the text in a headset; while (3) repeating the text aloud along with or as close as possible to the pace of the speaker.

When the learner is instructed to repeat the text aloud, the learner may be instructed to use audio feedback checking facilitated by an audio monitor, for example, to ensure that the level of audio sound is above a point near the middle of an audio scale available on the multimedia device or computer. In some embodiments, an audio scale may be displayed as an audio monitor on the display while the learner repeats the spoken words from the lesson. The audio monitor may contain a minimum level, a maximum level, and an indicator that shows the speech volume of the learner's repetition relative to the minimum level and the maximum level. The learner may be instructed to repeat recorded text at a volume sufficient to cause the audio scale to register at least 40% or at least 45% or at least 50% of its maximum volume, for example. The process may further comprise providing audio feedback based on similarity of original recording sound and sound of the sentences repeated aloud by a user of the specially written lessons ensuring the quality of articulated repetition of the recording. In some embodiments, the learner may be recommended or instructed to use a headset-type microphone as the audio input, thereby ensuring clearer sound quality of recordings that may be evaluated to provide feedback.

It is believed that RLR may help learners to recreate the harmony and rhythm of a new language. First, the harmony and rhythm are alien to learners but after multiple repetitions of emotional and interesting lessons based on a certain amount of most frequently used words, for example, 2000 words, the brain starts subconsciously analyzing them looking for patterns. Pattern recognition is generally applicable to all aspects of life, from driving cars to speaking fluently in a foreign language. The ability to find patterns in a new language is facilitated in the RLR process by using multiple repetitions of emotional texts which learners are re-living in a new language.

In preferred embodiments, the recording is made by native speakers in Special English (if the new language is English). Special English is a speaking style developed by Voice of America and is about one-third slower than regular VOA English or about half the speed speech normally encountered in conversations with a native speaker. For example, if a native speaker of English typically speaks at a rate of about 110 words per minute to about 150 words per minute, Special English may be recorded at a recording rate of about 55 words per minute to about 75 words per minute, for example. Special English avoids the use of contractions and slang, and all words are clearly articulated. The three-action activity (reading, listening and speaking simultaneously with the speaker) of RLR imposes a significant load on the brain and automatically eliminates cross-translation.

Meticulous imitation and loud articulation of all sound units of the recording that the learner can recognize (including phonemes, syllables, and words) to the best of learner's ability develops phonological awareness to a foreign (for example, English) language. Careful imitation and articulated repetition of the recording are ensured by providing audio feedback based on comparing two audio curves and measuring the similarity between the original recording of the lesson text, and the learner's recording of the same text created during learning session.

The RLR process operates in a similar manner for any new target language, although it is more pronounced for dissimilar languages (such as Chinese and English, for example) than for similar languages (such as French and English). The RLR process enables adult learners to overcome the brain resistance to a foreign language on a subconscious level by silencing the mother tongue and eliminating subconscious cross-translation to and from the mother tongue.

To enable the learner to recognize the sounds first and then to acquire the ability to remember and produce the phonemes and sound patterns, rhythm, and intonation of a new language using RLR, lessons preferably may be recorded by a human being with a high quality of recording so that emotional intonations are preserved. Phonemes and their combinations in a multitude of words in any language contain more than simple sound frequencies that can be reproduced by computer or robot or synthesizer. In fact, they contain much more information that only the human ear can decode. This information may include tone, rhythm and intonation, and some subtle energy that allows a listener to visualize the words that have been understood. For example, some people who listen to certain audio books attest to clearly visualizing the scene or situation described, while in other audio books the same people attest to only hearing the words, whereupon they must logically reconstruct the described situation. This phenomenon may be explained by the idea that a recording incorporates not only sound as mere audio frequencies but also much more information, that may affectionately be called the "human touch" of the person who produced the recording.

Robotic learning based on a speech synthesizer can be used in some instances, particularly by adult learners who already have an intermediate or even advanced level of language knowledge or skills and are familiar with all phonemes of a new language. However, language robots or speech synthesizers are not recommended for learners who only start acquiring fluency in a new language, because beginners need to build their phonological awareness. As such, in preferred embodiments a recording with the elements of "human touch" is provided. This human touch is preferably combined with Special English (or a similar version of the target language if the target language is not English) for developing phonological awareness. When learners acquire phonological awareness and fluency on a limited number of words (about one thousand words), then the speech speed of the recording may be gradually increased. After about twenty lessons the learner may acquire skills to understand and reproduce speech at a normal speech speed without the need for special articulation.

In spontaneous or untutored language acquisition, the sounds of the language are embedded in a relevant situational context presented on a multimedia device, smart phone or computer display, for example, and the learner's task is to extract and master from this material first the phonemes and sound units and patterns of a new language and then the rules for using the language. The term "spontaneous learning" is used to denote the intake of a foreign language in simulated in the applications' everyday communication in a natural fashion, free from systematic guidance; it amounts to "picking up" pieces of information without conscious awareness or memorization. This kind of spontaneous or unconscious learning stimulates the desire to learn and is put to use in the applications described below.

In contrast to language learning that consists of internalization of explicit rules under guided learning and conscious control, in spontaneous learning a learner starts with imitation of the recording of a new language that amounts to speaking mechanically before acquiring the skill of producing the language. Then a number of steps are rapidly acquired by learner's subconscious mind: hearing comes first and then come recognizing phonemes and sound units or words of a new language and being able to reproduce them automatically without thinking. These skills result in comprehension of the situational context, followed by the ability to produce the target language in a similar situation. The comprehension of the situational context may be ensured by availability of all lessons and drills in the native language and used whenever there is a need in comprehension. In some embodiments, the quality of production may be monitored by built-in audio feedback tools. In contrast to conventional methods, in which learners are stressed due to permanent corrections of errors and testing, the feedback is typically produced in the described applications in a stress-free environment, in which the learner is instructed not to analyze the feedback and to try to consciously control production of the language.

Native speakers of a language have a functional understanding of its structure, even though they may not be able to verbalize that knowledge. This type of grammar is called intuitive grammar and is acquired in the course of RLR process due to elimination of cross-translation. Learners who struggle with the cross-translation problem cannot acquire intuitive grammar, because their brains are preoccupied by translating words of a foreign language into native language to grasp their meaning. The intuitive grammar, which acts more like a feeling than a memorized set of rules, is a byproduct of using RLR in acquiring fluency in a foreign language. It helps learners to form the grammar from the language and not to build a new language by applying grammar rules. For example, the learners' speech may be grammatically correct after completing the language training of the RLR, because an adults' brain forms an intuitive grammar by repeating hundreds and thousands of sentences when using RLR.

Adults speak by word chunks and collocations, which the brain formulates correctly according to the developed habit of using new language patterns and associations. In some embodiments, all materials in the described applications are composed to encourage students to discover grammar rules on their own. Intuitive grammar helps children to speak in perfect English without knowledge of formal grammar rules. Adult learners may also acquire the intuitive grammar in the course of the RLR process by experiencing live situations in transparent examples presented in comprehensible lesson texts. RLR helps learners in understanding the target language in "chunks" rather than word-by-word. Thereby, learners internalize a target language in large segments such as phrases and sentences rather than a laborious and inefficient word-by-word learning. Lessons and drills designed for the RLR process activates the power of the right brain. Psychologists and educators suggest that learning on the right side of the brain is more efficient, because doing so opens the vast capacity of subconscious memory.

Interhemispheric foreign language learning is a form of learning that activates both left and right hemispheres of the brain. It could be applied to many types of learning, but exceptionally promising results could be expected in foreign-language teaching/learning. Traditional foreign language learning, which focuses on learning vocabulary and grammar and using textbooks, mainly activates the left hemisphere of the brain. Interhemispheric learning also stimulates the right hemisphere and enhances interaction between both hemispheres. Some experts in brain development suggest that the human brain is like a camera and that, through right brain function, the human brain continuously records as images everything that people see, hear, smell, taste, and touch. The right brain's mass-memory and automatic processing capability is believed to enable the human brain to file, organize, and store all these memory images instantly.

Although the human memory has this phenomenal capacity of recording events, it does not mean that people can bring any memory to the outer awareness at will. It is believed, for example, that the human left brain processes conscious memories, and the right brain processes subconscious memories. It is also believed that most of the human memory is stored at the subconscious level, which is not so easily moved to the left brain's conscious awareness, unless adults have the right pathways developed between the right and left brain hemispheres.

So, to find a better way to perfect memory adults need to learn what can strengthen the pathways between the right (subconscious) brain to the left (conscious) brain. The connections that make it happen are called "synapses", which permit a neuron to pass an electrical or chemical signal to another cell. Synapses are formed in learner's brain in the course of RLR process due to the learner's emotional involvement and re-experiencing live situations described in visual and emotional texts of lessons of applications. Furthermore, the more synapses adult learners have and the stronger those connections are, the more conscious memory can be produced and the faster learners may bring those memories forward as useful information.

Interhemispheric foreign language learning can be initiated while the learner performs the three actions of the RLR process. This type of learning may be enhanced by active participation and by performing a number of specially designed drills that may function, at least in part, to activate the right hemisphere of the learner's brain.

In embodiments of the RLR process, adult learners of foreign languages are advised to use as many of their five senses as possible, as often as possible. Use of "imaginative memory" to visualize connections, stories, objects, etc., along with the respective foreign words describing them, facilitates interhemispheric learning and imprinting of word-image combinations in the long-term memory. Memory is the retention of information over time. There are many kinds of memory: short-term memory, long-term memory, visual memory, auditory memory and imaginative memory, for example. Short-term memory or working memory lasts from a few seconds to a minute. Repetition helps to transfer information from short-term memory to long-term memory lasting from a minute or so to week or even years. Visual memory is a learner's ability to remember what the learner has seen, while auditory memory is a learner's ability to remember what the learner has heard. According to some embodiments, in the RLR process adult learners activate both visual and auditory memory while repeating in a headset after the speaker and imitating intonation and rhythm of the recording, thereby engaging in interhemispheric learning.

In embodiments in which the RLR process is used in a blended learning, language tutors may instruct learners to perform mental visualization when working with applications and to work in pairs whenever possible, whereby learners may ask each other about the text and vocabulary learned and helping each other. Working in pairs has one additional advantage: when one learner repeats the text and a second learner listens how repetition is performed, the second learner becomes not only a learner, but also a teacher. Combination of the function of teaching and learning may help create a positive, stress-free learning experience.

Finally, integrating elements of interhemispheric learning such as speaking aloud, using gestures, writing, or recording separate phrases or the whole lesson and practicing role-playing is ensured both during the self-study component of blended learning and when guided by a language tutor who is using the same paradigm of interhemispheric foreign-language learning when working with learners face-to-face or using internet-based virtual classrooms.

When cross-translation is eliminated, adult learners are able to form direct wiring between the word block or collocation in a foreign language and an image or situation they have described in the predetermined foreign language according to the rule "neurons that fire together wire together."

In some embodiments, systems for learning or instructing a target language are provided that belong to the class of Rich Internet Applications (RIA). An RIA is an Internet-based application that has many of the characteristics of desktop application software, but is delivered by a site-specific browser, via a browser plug-in, such as Java applet, or Adobe Flash, or HTML5 or Microsoft Silverlight. Although new Internet standards have emerged and continue to emerge constantly, the standards continue to use the principles behind the RIA.

In some embodiments of RIAs, application content may be stored on a Web Server that can be downloaded to any computer or multimedia device by using the Client-Web Server model of computing, which invokes a client and a web server. Use of an RIA does not preclude implementation of applications on computers or any personal multimedia device as a pre-installed version with an option of updating or expanding the application scope by using an RIA. The latter allows for a certain stand-alone functionality that could be called Lite application version. To upgrade a Lite version to a subscription-based version, for example, expansion of application capabilities may be achieved by using the Client-Web Server model of computing and requesting and downloading additional content. Access to lessons in an RIA may be provided by subscription using a flexible subscription tool for lesson-based and/or time-based subscription. The user or client may log into the Web server to request a subscription or specific content.

The RIA may have a distributed structure that distributes tasks or workloads between the provider of a resource or service such as a Web server and service requesters such as clients. Client and servers may communicate over the Internet on separate hardware. The client may reside on a computer or personal multimedia device of the learner, and the server may be based on any mainframe computer. A Web server machine is a host that is running one or more server programs, which share their resources with multiple clients. Server programs wait for requests and process requests, for example, by creating a new user folder, sending content to the client, and calculating drill scores from any recorded drills received back from the client.

A client does not share any of its resources, but requests a server's content or service function. The client's resources may include an audio player control, a lesson execution button, and a relaxing screen (described in detail below). The client's resources also may include biofeedback learning, a drill execution button, a dictionary that provides support in the native language of all lessons and drills built into the multimedia device or computer applications and displays the translation into native language for a predetermined time, for example, for ten seconds, that is enough to create a visual image of a new language word and precludes remembering the pair of a new language word and the translation of this word into the native language.

An exemplary embodiment of a client system 100 that a learner may use to take part in lessons or instructions using the RLR process is provided schematically in FIG. 1. At the center of the client system 100 is a processor 110. The processor 110 may be any type of device capable of processing information stored on electronic media. For example, the processor 110 may reside on a computer chip in a device such as a personal computer or a mobile personal device. The processor 110 communicates with an application engine 120 that may contain computer code that instructs the processor to display information or a user's working environment, or to act on responses from the user.

The application engine 120 may communicate with a lesson database 130 and a word database 140 to construct full RLR lessons. The lesson database 130 may include electronic versions of predetermined texts and recordings to be used in lessons involving the RLR process and may also include electronically stored graphic images to be displayed during the lessons. The word database 140 may include lists of words included in the lessons found in the lesson database 130. The word database 140 may include a word inventory 300 in the form of connected entries of the words in the native language of the user and in the target foreign language, and may also include recorded versions of each of the words in the target language. An exemplary embodiment of a word inventory 300 contained in the word database 130 is provided in FIG. 3. As described above, the word inventory 300 is also connected with audio images of each of the words in the target language for playback on the audio output or display on the display. It should be understood that the learner never sees the word inventory 300 while performing RLR lessons but, rather, that the word inventory 300 and the word database 140 are electronic files used to provide information to various components of the application. It is believed that it may be advantageous to hide the word inventory from the learner because in the RLR process the learner acquires fluency by learning words through collocations and contextual sentences, not through separate word lists.

The processor 110 of the client system 100 may also communicate with a display 160 for displaying information and with an input device 170 for receiving inputs from the user. The display 160 may be any suitable display device such as a stand-alone monitor or television screen or a display of a handheld electronic device such as a smart phone or music player or other personal device capable of running applications. The input device 170 may be any suitable device through which a user can input textual information to the processor 110. For example, the input device 170 may be a stand-alone computer keyboard or a touch screen of a mobile or personal device.

The processor 110 of the client system 100 may also be electronically connected with an audio output 180 such as a speaker, for example, and with an audio input 190 such as a microphone, for example. The audio output 180 and the audio input 190 may be separate or may be components of an integrated device such as a headset with a microphone, for example. In some embodiments, at least the processor 110, the audio output 180, the audio input 190, the application engine 120, the lesson database 130, and the word database 140 may reside on a single device such as inside a personal computer or mobile telephone or personal device capable of running applications. The processor may also be connected to removable storage media 150 that may be used to transfer information to the processor 110 related to a user's personal progress with the RLR process. Additionally, in some embodiments described in greater detail below, the removable storage media 150 may be used to record information from the processor 110 such as a customized speech recognition database derived from the user's performance in RLR lessons.

During the use of lesson modules involving the RLR process, a user or learner can choose a lesson or drill, or can start or stop a lesson or drill. The user can pause the lesson or continue displaying it, choose and play drills, record and play the recordings, and connect the application to social networking sites to perform social networking tasks without leaving the program.

Figure 2:
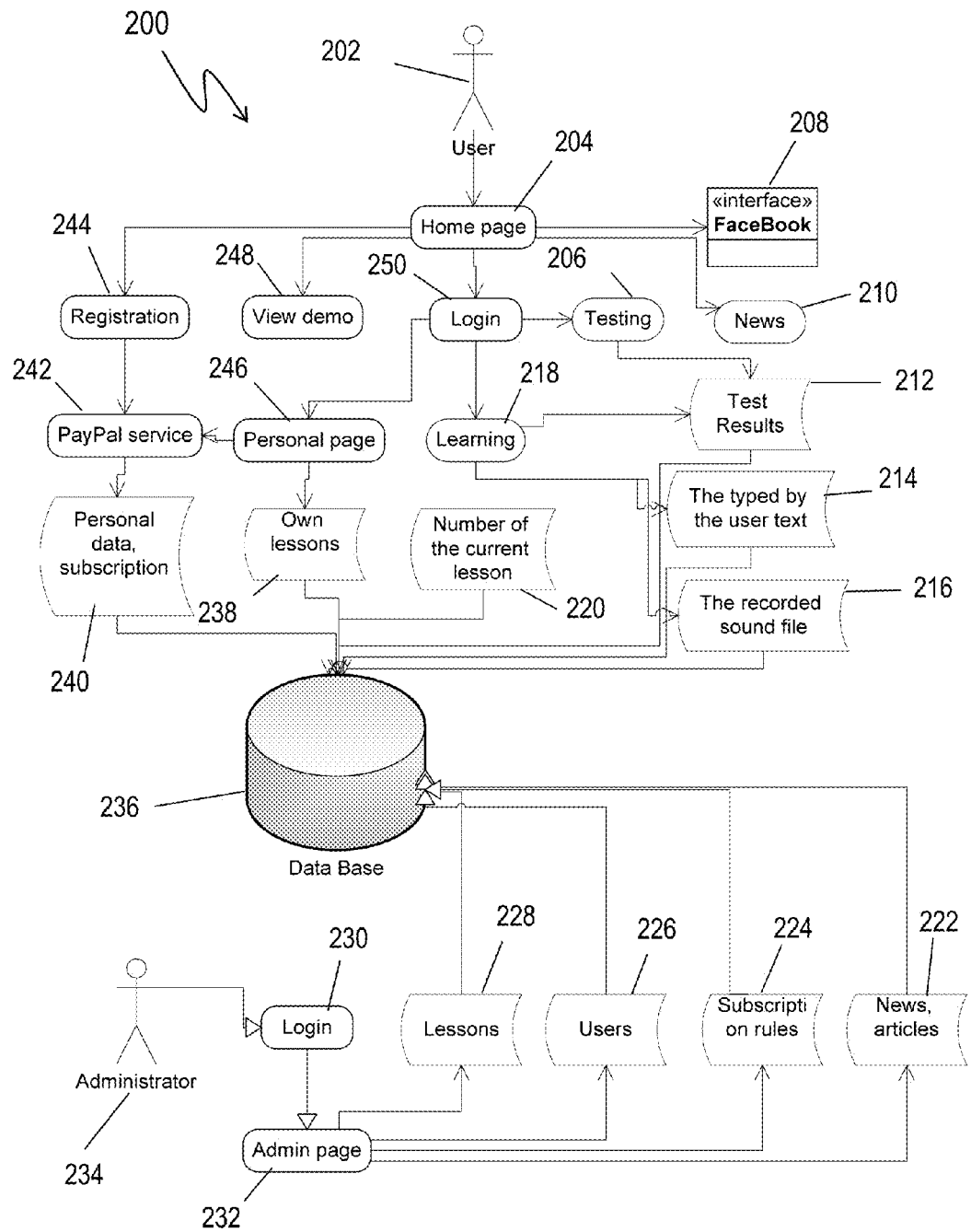
FIG. 2 is a schematic use-case diagram representing a user's interactions during instructing a foreign language by methods according to embodiments herein.

A functional description of an exemplary embodiment of a computer application used as a framework for providing lessons using the RLR process is provided in the Unified Modeling Language (UML) activity diagram 200 of FIG. 2. The activity diagram 200 describes the business and operational step-by-step workflows of components in the described Rich Internet Application. The activity diagram 200 shows the overall flow of control. The user 202 has access to a home page 204 by direct login 250 or by social networking program, for example a Facebook interface 208. During registration 244 the user may be given the choice of direct login 250 or login via social networking, for example QQ International or Facebook interface 208. When getting the first experience with the application the user may select to view a demo 248. The demo 248 may contain additional pages in the user's native language and in the target language, for example English, which explain the mechanism of the new learning paradigm.

In some embodiments, the user's initial experience with the application may include performing testing 206 to determine the level of active vocabulary in a target language, for example English. The testing may comprise Intelligent Friendly Testing (IFT), which is called "intelligent," because for each registered user the application automatically keeps track of studied lessons and selects the testing dictionary according to the list of words contained in lessons previously studied. The IFT is called "friendly," because in contrast to conventional testing and certification programs the program is not checking the information about the language the user should memorize but, rather, it checks the ability of the user to speak freely and fluently using the word chunks that were covered in the studied lessons.

In some embodiments of the testing function, the testing module automatically selects for the testing a built-in dictionary that contains about 2000 most frequently used words for quantitative evaluation of the level of the user's knowledge of active vocabulary and shows the test results 212 in a window on a display, for example. The application may comprise the built-in dictionary and may comprise a storage medium containing instructions to direct the application to retrieve words from the dictionary to display to the user.

In some embodiments, the application may include access to news source 210 of the learners' choice. The application may include a personal page 246 that is connected to personal data and may provide choices for subscription 240 and to PayPal service 242 or any other similar service for performing financial online transactions. The personal page 246 may be associated with a number of workflows and may be designed to collect and store along with the personal data and subscription all information associated with the learning 218 process, such as the number of current lesson 220, and owned lessons 238 that were added to the standard program according to the learner's request. The personal page may be used as repository of test results 212 associated with the last lesson that was completed to the moment of testing. The personal page also may contain the results of processing the recorded sound files 216 created by the learner. As the result of the processing of files recorded by the user 202, the database 236 is created for individual voice recognition, which incorporates the inventory of all words used in all studied lessons of software or application along with their audio image representation created by the user 202 during learning of the lessons.

The database is the central part of the client-web server model of computing and acts as the main repository of all data created in the course of user interaction with the application during learning process and execution of drills as well as the data that constitute the core of the method and system of embodiments described herein. The database may be positioned on a main frame computer and may be controlled by an administrator 234 who receives access to the admin page 232 after successful secure login 230 procedures. The database 236 may contain all lessons 228 of a target language created according to the methods described herein along with the mandatory support of all lessons in the native language, for example in Chinese for Chinese students learning languages such as English, for example. The database of all registered users 226 who follow the subscription rules 224 may be included as a component of the main database 236. The admin page 232 may be used by web servicing personnel to keep up-to-date news and articles 222, to which digital learners have access through social networking sites without logging out of the foreign language acquisition system described herein.

According to some embodiments, methods and systems of instructing a foreign language may be implemented on any computer or mobile or personal device using the client-server model of computing realized as a Rich Internet Application, such as the systems described above with reference to FIGS. 1 and 2. In some embodiments, the RIA may be stored on a mobile or personal device, onto which the RIA could be pre-installed or downloaded from a web browser, for example. When the application is pre-installed on a mobile or personal device it may incorporate the basic functionality. In some embodiments, functions may require connectivity to the web server. Such functions may include, for example, downloading new content or additional lessons, creating audio feedback based on similarity of original recording sound and sound of the repeated aloud by a learner sentences of the specially written lessons.

Some embodiments of systems and methods for learning foreign languages using the RLR process may incorporate the idea that modern adult learners are digital learners with new learning habits and different ways of interacting with the surrounding world and with each other. Participation in social networking is commonplace for digital learners and in some embodiments may be made available in the RIA without leaving the RIA. The RIA may include functionality to enable the learner to perform routine social networking functions by accessing Facebook, Twitter, LinkedIn, Blogger, or any other social networks to gain assistance with homework or to be in touch with peers. In some embodiments, the social networks may be used to foster communication between learners and teachers, or among learners in case of blended learning paradigms. For example, the RIA may include functionality whereby a learner may ask a friend to help find up-to-date quotations for a surprise drill task, such as: "the world memory champion" provided by the RLR process application, system, and methods described herein. After receiving a reference link and thanking for help, a user may click a button to return to the RIA and continue the training session using the methods and systems described herein.

In some embodiments, lessons involving the RLR process may involve displaying on a display specially formatted text of the lessons. For example, the specially formatted text may include boldface formatting or coloring of collocations. Collocations in general are words or groups of words that are commonly found together in written or spoken language. Therefore, special formatting of such collocations may facilitate more efficient learning of word groups rather than isolated individual words.

In some embodiments, special formatting may be introduced to all lessons and drills used in the RLR process to facilitate restoring in adult learners ability to mental visualization. For example, every paragraph displayed on the display may consist of 4 to 5 lines and an empty line. The length of every line of the text on the application screen may be limited to fewer than 50 symbols, for example from 20 to 45 symbols, particularly to accommodate for a limited screen size of personal multimedia devices. Nevertheless, the same presentation of text may also be used on stand-alone monitors, because the presentation may enhance a learner's ability to visualize the text. After multiple repetitions a learner may begin seeing more words at a glance horizontally as shown concurrently in a few lines. Use of narrow columns on the application's display with about six or seven words or fewer per line and continuing multiple repetitions results in stretching learner's vision vertically. It is believed that the learner's habit of word-by-word reading may be turned off and substituted by vertical reading, which in turn constitutes the essence of fast reading and contributes to elimination of subconscious cross-translation into the native language and facilitating learner's ability to produce whole sentences in a foreign language with natural fluency as conformed by the audio feedback tools build-in the applications.

In some embodiments, a database for individual voice recognition may be created as a byproduct of using simultaneous repetition or speech shadowing throughout instructing a foreign language without direct special training of the software usually required in the conventional voice recognition applications. The database may be created for subscribed learners, for example. The database for individual voice recognition may incorporate a word inventory including all words used in lessons of software or application, and their respective audio images recorded separately for each user as they perform speech shadowing throughout the RLR process for acquisition of a foreign language. The recorded audio images of each word spoken throughout speech shadowing may be sent to the Personal page on the web server and added to the database along with respective text and are used for creation the personal voice recognition module for each individual user and thereby identifying areas or patterns that can be used in creating custom specialized training.

In some embodiments, the database for individual voice recognition also may incorporate the inventory of all words used in speech shadowing of the text of essays created by individual learners in response to a research component of surprise drill incorporated into software or application for learning foreign language, and an audio file of audio images recorded by a user after completion the training of speech shadowing of the said essay.

In some embodiments, individual voice recognition modules for each individual user may be turned into an independent utility module, produced on the web server for each subscribed individual user. The independent utility module could be downloaded and used within or outside of the described language-learning software or RIA for different purposes, for example, for text-to-voice conversion or for turning text messages into voice messages or for voice-to-text conversion.

In some embodiments, the individual voice recognition module may be an open-ended interactive module with a built-in self-improvement feature, whereby each combination of a word and its respective audio image recorded by the individual learners during regular usage of proposed software or application may be used for continuous averaging of audio images in the database that results in permanently increasing the scope of database and accuracy of recognition. This individual voice recognition database is a byproduct of learning efforts and is created without direct involvement of learner in the software training process.

The computer-based applications such as RIAs described above for use in systems and methods for learning foreign languages by the RLR process may incorporate a number of individual lessons or drills. Lessons of the RIAs according to embodiments described herein may incorporate a certain number of typical drills, for example one or more of the ten drills presented in FIGS. 6A-6C and further described below. Each drill may include a description of what to do, such that by clicking an execute button, for example, the drill may be executed by the learner. Before execution each drill may show the text of the drill in the native language (for example, Chinese) and in the target language (for example, English), but the audio file may be played only in the foreign language. Each time a learner opens an application for learning a lesson, the content editor may begin by playing the relaxation music and displaying the word cloud, and then may load the final text from the web server which was saved when the user was working the lesson the last time. Each lesson uses the Note field that is saved on the server. The learner may be given an option to save a note field to each lesson on a personal multimedia device or a computer.

The illustrative drills summarized in FIGS. 6A-6C will now be described in greater detail. It should be understood that the drills described are intended to be exemplary only and do not limit the methods described herein to only the exemplary drills, to all of the exemplary drills, or to any particular order of the exemplary drills.

Drill 1 may be, for example, "read the text in your native language without pronouncing the words and visualize the story given." In this drill the learner may be provided with support in the learner's native language both for all lessons and drills built into personal multimedia device or computer applications and also for explanations and instructions. The inclusion of some native-language support may ensure stress-free learning, thereby facilitating the acquisition of target-language fluency by the RLR process. While using RLR according to embodiments herein, the learner always hears and repeats the words in the target language. Nevertheless, it is believed that reading the text in native language before attempting CTA may be useful to create visual images of all words in a lesson, which will then be drilled only in the target foreign language, thereby making the lesson context comprehensible.

Drill 2 may be, for example, "Repeat aloud the recorded text, using headphones and speaking simultaneously with the speaker, with a delay of one or two words and without stopping the tape. While doing this, follow the English text with your eyes and imagine that you are participating in the situation, do not pay attention to the details." In this drill it may be important that the recording be done by native speakers in Special English (if the target language is English) and that learners use headphones or earphones while performing speech shadowing or CTA. Special English is about half the speed of one's natural speaking speed, lacks contractions and slang, and has all words clearly articulated. The CTA imposes a significant load on the brain and automatically eliminates cross-translation, i.e., the association of new words in the target language (English) with the words in the native language.

Drill 3 may be, for example, "Continue repeating the recorded text simultaneously with the speaker many times until you can do it easily and without omissions. Then do a few more repetitions with your eyes closed, without analyzing your own pronunciation." For this drill, it is recognized that between a quarter and a third of brain power is typically devoted to vision, such that when a learner closes his or her eyes and continues speech shadowing, the additional brain resources freed from use by vision may be used for imagination and visualization of the situation described in the lessons. Thereby, closing the eyes in this drill enhances learners' imaginative memory and direct wiring between the word block or collocation and image or situation they describe which results in turning-off subconscious cross-translation and natural fluency in a foreign language, which in turn may be confirmed by audio feedback tools included in the RIA.

Drill 4 may involve for example, a sentence being taken from the studied lesson and shown on the display with a request: "Continue repeating the recorded text concurrently with the speaker, but this time type in the window any words that you recognize without stopping the recording. Repeat this drill a few times until the number of typed words in the Note is more than 20." Thus, while the learner is hurrying to type words while the recording continues to play, the user does not have time to think about the words or to cross-translate.

Drills 5.1, 5.2, and 6 performed together may be described as a repetition drill. Beginning in Drill 5.1, a paragraph is taken from the studied lesson and shown on the display with an instruction to the learner to: "repeat this paragraph a few times with increasing speed." For example, the paragraph shown in FIG. 6A may be used, or as another example, the following may be used: "English became the global language and on this ground loses any connection to any particular culture"

After a few repetitions of Drill 5.1, the learner proceeds to Drill 5.2, during which the following appears: "English became the . . . and on this ground . . . any connection to any . . . ." In this sentence, words are missing. One word, two words, three words, or even five or more words may be missing from the sentence provided in Drill 5.2, as illustrative examples. The words that are actually missing may be selected randomly to permit repetition of the drill with different drill sentences each having different words missing. The learner is instructed to read the incomplete paragraph multiple times as quickly as possible, as though the missing words were still present. Thus, subconscious memory is used to remember the missing words, because in Drill 5.2 the learner automatically fills in missing words. During speech shadowing the brain determines the patterns that are automatically reproduced.

After Drill 5.2 is mastered, the learner proceeds to Drill 6, in which a garbled paragraph is displayed, such as the one in FIG. 6A or here [all errors intentional]: "Enlgsih bceame the golabl lnagauge and on this gruond loses any cnnoetcion to any paritcluar cluture." The learner is asked to read the garbled paragraph as quickly as possible in the manner it would be read if all the words were correctly spelled, as they were in the drill paragraph of Drill 5.1. Drill 6 may be considered a testament to the flexibility of the human mind. The theory behind the garbled paragraph may include the observations that humans use only the first and last letters of a word when reading and that humans read by recognizing whole words. These observations, therefore, may be applied for training automatic reading and speaking. Thus, Drill 6 could be also considered as a practical demonstration that the subconscious cross-translation is turned off during the drill. This is because the drill is may not be possible to successfully complete unless the focus of the learner's mind is changed from a paradigm of cross-translation to a paradigm of reading by complete words only. Drill 6 is also designed at least in part to improve learner's skill of fast reading and visualization.

Drill 7 may be, for example, an interactive drill titled "One Man Show." In this drill, the learner user may be instructed to complete a word block provided before the drill and act out a scenes using dominant senses (hearing, sight, touch, smell, and taste). In acting out each scene, the learner may choose to be an actor, a singer, a dancer, a stage director, or an artist, for example. First, the user will use the word blocks from the current lesson to work through the scenes. Then the user may use word blocks from other lessons. Non-limiting embodiments of such scenes may include those listed in FIG. 6B, for example, or also: 1. It is nice to see . . . ; 2 . . . can write and . . . ; 3 . . . a better way to become . . . ; 4. That must be not . . . ; 5. Sometimes I think . . . ; 6. English became the global . . . ; 7. It is an interesting . . . ; 8 . . . cultural aspects about . . . ; 9. It sounds . . . ; or 10. I am very . . . ; or 11. If we would only learn . . . .

In these exemplary scenes, the learner is supposed to complete the above phrases taken from the studied lesson and create a sentence or a few sentences expanding the situation. With each word pronounced by the learner, a counting slider may appear on the display and move in a particular direction. When the learner pauses for more than 3 seconds, for example, or after the learner presses a stop button, a number of words pronounced by the learner, as verified by the individual voice recognition system, may be shown on a display.

Drill 8 as shown in FIG. 6B, or any other drill during the sequence of drills, may be a surprise drill selected randomly from a database containing a short video clip, latest news, or a task for researching a given topic. Opening the surprise drill may show a randomly selected drill from a database prepared in advance and regularly updated. Downloading the surprise drill from a web server that will create a sense of open-ended interactive program, in which drills could be an additional video story, or news topic, or a research on a given topic. Example of a surprise drill: Perform research on the following topic: "water powered engine." At the beginning of the course the questions for suggested research, to be made according to the surprise drill, may be simple, for example: (1) The tallest building in the world; (2) The strongest man on the planet; (3) The most uplifting quotes; (4) The longest tunnel of the world; (5) The world memory champion. After the user has acquired about 1000 words of active vocabulary the questions for suggested research may become more complex, for example: (1) Water powered engine; (2) The essence of photo reading; (3) The longest bridge in China; (4) The invisible gorilla test; (5) The main characteristics of diet in China; (6) Drinking herbal tea.

In the surprise drill, the user may be instructed to perform the research and create a short essay (up to 200 words) on the selected topic which is then copied and pasted into an empty display window of the RIA. In this example, an essay such as the following may be written by the learner and pasted into the display box: "Most engineers and mechanics are taught that it takes more energy to produce enough energy to propel a car, and therefore water powered engine will never work. You cannot break the laws of physics. They say you will not get enough BTU's from hydrogen or egas to push an internal combustion engine motor. They are right, gasoline gets too hot, and 78% of the energy produced goes right out the exhaust pipe. A complete waste of energy is applied every day we drive our present vehicles and also the heat contributes to the Global warming. With "On Board Electrolysis" with egas or supplied by hydrogen tanks, you don't need all this heat. What you need is strong combustion to push the piston down. Hydrogen creates 2½ times more combustion power than gasoline, with less heat! A trillion dollar industry awaits you."

Once the learner-written essay is pasted into the RIA, a text-to-voice program may be invoked to read the learner's essay back to the learner. Then, the learner should repeat aloud the text of the essay while listening to the text-to-voice program that creates narration of the text and speaking simultaneously with the speech synthesizer. When the learner completes the repetition without omissions or mistakes, the program may suggest repeating the text one final time without listening to the robot. All words of the essay and their recorded audio images may be sent to the web server and added to the personal database used for creation of the individual voice recognition module, thereby further adding value to the voice recognition module.

In Drill 9, the learner may be instructed to read aloud the entire text of the lesson without listening to the recorded version of the lesson. The sound image of the learner's reading of the entire lesson text may then be uploaded to the web server and added to the personal database used for creation of the individual voice recognition module, thereby further adding value to the voice recognition module.

In Drill 10, the learner's active vocabulary may be tested. The learner may be instructed to view a word on the bottom of the display screen and use the word in a sentence. Then, the user records the sentence and repeats the view/record process multiple times, for example, at least ten times. The learner may then choose to continue testing or to complete testing and upload or share the recorded sentences. These recorded sentences may also be sent to the web server and added to the personal database used for creation of the individual voice recognition module, thereby further adding value to the voice recognition module.

In an exemplary drill not shown in FIGS. 6A-6C, the learner is encouraged to acquire new vocabulary based on contextual clues. The learner may be instructed to create a new sentence with the highlighted word. For example: "The new student was hilarious; he told us funny stories, we were laughing all the time". A learner repeats this sentence a few times after the speaker, and then he should create and record his own sentence with the highlighted new word, for example: "It was quite a hilarious movie, especially when the eight-year-old girl demonstrated her acting capabilities." Comprehension of the new words "hilarious" in the situational context becomes possible due to the ability of the present method to turn off cross-translation automatically and to the restored ability to visualize the described situation. In this case the learner's brain automatically ignores the unknown word to visualize the whole picture and then helps the learner to assign a certain meaning to the new word according to the context. This capacity of the brain to restore the meaning by the context allows reading freely the text, in which a learner knows only 70-75% of words without using a dictionary. This drill helps to increase learner's active vocabulary without special efforts and awareness on the user's part.

In another exemplary drill not shown in FIGS. 6A-6C, the user may be instructed to look at the text of the lesson in the native language and recite it as if reading it in English. The user may be instructed that, if the lesson was read fluently, the user may proceed to the next lesson. To make certain a user has mastered the lesson, the user may be asked to look at the text of the lesson in the native language (Chinese, for example) and recite it as if it were written in the target language (English, for example). If the user reads the text fluently, it means that the words in those sentences have become the user's own word blocks. From then on, whenever a similar situation occurs in life, the user will be able to express thoughts in the target language automatically, without thinking. The learner will not need to make conscious efforts to express thoughts, and the words will flow freely, called forth by the images and feelings experienced in the situation.

In some embodiments, the methods for instructing a foreign language may include priming implicit memory of the learner before the learner proceeds to use CTA. In some embodiments, priming implicit memory may include providing relaxation music for the learner, instructing the learner to view a word cloud, or instructing the learner to listen to relaxation music while viewing a word cloud. These embodiments of priming implicit memory will now be described.

Figure 4:
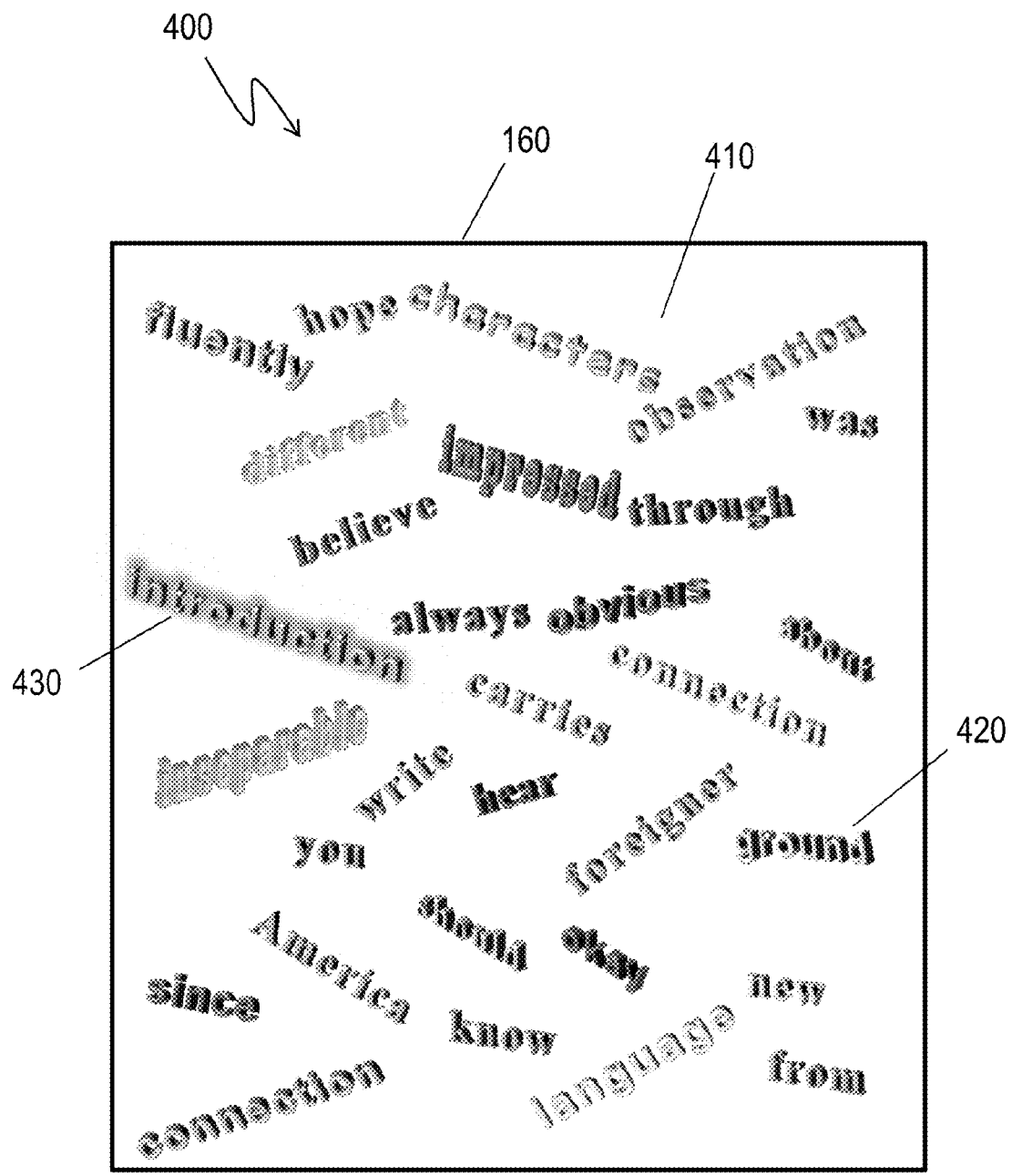
FIG. 4 is an exemplary configuration of lesson words arranged as a three-dimensional word cloud, according to embodiments herein.

Without intent to be bound by theory, it is believed that listening to relaxation music before each lesson for a predetermined period of time, for example, about 60 to 70 seconds, induces a meditative state and encourages alpha/theta brain wave activity to facilitate spontaneous acquisition. It is further believed that listening to the relaxation music while simultaneously visualizing the new words from a lesson shown in the form of three-dimensional (3D) word cloud 410 on a relaxation screen 400 as shown in FIG. 4, for example, may activate interhemispheric learning. Relaxation and visualization may act as a priming process of implicit memory. Implicit memory is a type of memory in which previous experiences aid in the performance of a task without conscious awareness of these previous experiences. Evidence for implicit memory arises in priming; a process whereby adult learners show improved performance on tasks for which they have been subconsciously prepared. Visual priming may work best when visual signals are observed in the state of relaxation.

In the three-dimensional word cloud 410 shown on the relaxation screen 400, depending on the display resolution up to 20, up to 30, up to 40, up to 50, or up to 100, or even more than 100 cloud words 420 selected from all vocabulary words presented in the lesson and contained in the word inventory may be displayed on the display 160. For example, from 50 to 100 cloud words 420 may be appropriate for a personal device with high-definition display resolution or a large stand-alone monitor, while from 20 to 30 cloud words 420 may be appropriate for a personal device such as a smart phone. The cloud words 420 may be displayed in a three-dimensional font to invoke spatial aspects to the visual priming. The cloud words 420 may also have various orientations in two or three dimensions. The cloud words 420 may have different colors, such that a total or three, four, five, six, seven, ten, or even more than ten different colors of cloud words 420 may be present in the word cloud 410.

In some embodiments, the relaxation screen 400 may appear before a new lesson is begun or CTA is performed. It is believed that the learner's exposure to words from the word inventory that are part of a new lesson prior to learning/training the lesson may have a long-lasting effect, even if a learner has no conscious recollection of it. Namely, the exposure may facilitate spontaneous acquisition of a lesson in the target language. In combination with the priming process of implicit memory invoked through listening to relaxation music, for example, the new words seen while viewing the relaxation screen 400 may be recognized as having been seen before, even though the learner is unaware of the process. Thereby, the new words may be more easily transferred to the conscious memory of the user while the user performs the RLR process.

In some embodiments, background music may be chosen randomly from a folder containing prerecorded melodies or uploaded by a learner. Preferably, the relaxation music should be music conducive to stimulating alpha/theta brain wave energy. In some embodiments, for example, the relaxation music may be classical music having a tempo of less than 60 beats per minute. The Moonlight Sonata by Ludwig van Beethoven is one example of a piece particularly suitable as relaxation music. It is believed that a continuous tempo of less than 60 beats per minute may act on the learner to synchronize heart and brainwaves, thereby inducing a state of deep relaxation. Music without any obvious tunes or patterns helps to produce very deep relaxation. Tunes seem to tie up the mind, as do drum beats, which actively encourage a continuous response in the listener. In some embodiments, relaxation music may be selected with consideration including, for example, a very slow tempo, lack of sudden or unexpected changes, and music that can be played one piece after another such that the music flows easily without an obvious break.

Relaxation creates measurable changes in the body, such as a reduction in oxygen consumption, heart and respiratory rate, blood pressure, blood cortisol levels, and muscle tension, and an increase in the production in the brain of serotonin, which leads to feelings of calmness and well-being. There is also a noticeable change in the pattern of brain waves, as measureable by an electroencephalogram, when one is deeply relaxed. Very deep relaxation and meditation produce a pattern that combines the so-called alpha and theta rhythms, indicating a state of harmony. The collection of bodily changes that accompany relaxation is sometimes referred to as the "relaxation response."

The cloud words 420 that compose the word cloud 410 may be selected by an RIA module from a current lesson. In some embodiments, colored words in the word cloud 410 may improve right-brain activation before simultaneous repetition or speech shadowing is performed by the user. In some embodiments, the image may be static or still, except that every 2 to 3 seconds, for example, a random word in the cloud may be illuminated, highlighted, or even dropped to the bottom of the display 160. In some embodiments, the relaxation screen 400 and the word cloud 410 may fade out after about 60 seconds so that a lesson or drills further involving RLR or CTA may be started. In some embodiments, the learner may be instructed to listen to the relaxation music, view the word cloud, or both, for a predetermined period of time of from about 30 seconds to about five minutes such as, for example, about 30 seconds, about 60 seconds, about 2 minutes, about 5 minutes, or even for less than 30 seconds or longer than 5 minutes.

In some embodiments of methods for instructing a foreign language, a word cloud may be displayed to the learner not only before a lesson or drill, but also after the lesson or drill. In such embodiments, various words may be highlighted or dropped from the word cloud, and the learner may be instructed to write sentences using the highlighted or dropped word. The sentences may then be recorded and/or submitted to the web server for evaluation, for example.

In some embodiments, the methods for instructing a the foreign language may include native language support between when the priming of the learner's implicit memory and the Concurrent Triple Activity. The native-language support may include first making the lesson text available to the learner in the native language by displaying a native-language version of the lesson text on the display after the priming of implicit memory and before displaying the lesson text on the display. The native-language support may further include instructing the learner to read the native-language version of the lesson text silently while imagining a situation described in the lesson text. The native-language support may be opened by the learner any time when the learner needs support for comprehension of the lesson text. This native-language support is believed to supplement the priming of implicit memory by invoking imaginative memory of stories told through the lessons words before lessons and drills in the foreign language are attempted. The learner may be instructed to play the recorded version of the spoken words of the lesson text on the audio output at least once before the learner is instructed to perform the Concurrent Triple Activity. This native-language support is believed to supplement the priming of implicit memory by invoking imaginative memory of stories told through the lessons words before lessons and drills in the foreign language are attempted.

Figure 5A:
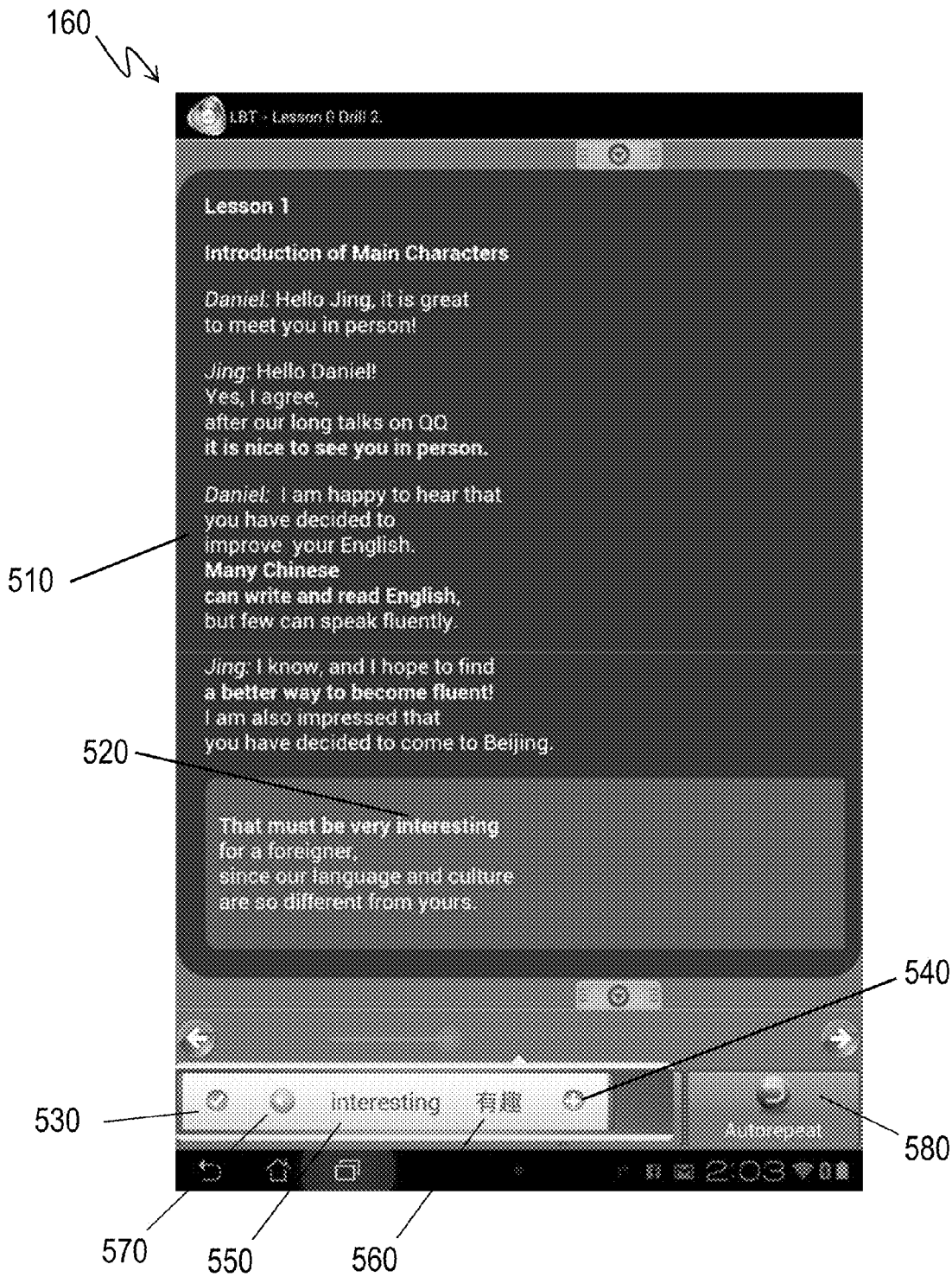
FIG. 5A is in illustrative display showing lesson text displayed, such that individual words are selectable by a learner to hear pronunciation of selected words by male and female native speakers and view the context-specific translation during computer-based implementations of methods for instructing a foreign language according to embodiments herein.

Referring to FIG. 5A, in some embodiments of methods for instructing a foreign language, when the words of a lesson text 510 are displayed during a lesson or drill, for example, each word of the lesson text 510 displayed on the display 160 may be selectable by the learner, such as by a mouse click, a keystroke, or a touch on a touchscreen, for example. Then, when the learner selects an individual lesson word 520, a context-specific translation 560 of the individual lesson word 520 in the native language may be displayed on the display 160 next to the selected word 550. The display 160 may show the lesson text 510 in the form of paragraphs with many words, all of which are selectable. If the learner were to select as the individual lesson word 520 the word "interesting," for example, an answer bar 530 below the lesson text 510 may display a context-specific translation 560 of the word, in this case two Chinese characters next to the selected word word 550 "interesting" in the answer bar 530.

In some embodiments, when lessons are displayed on the display as in FIG. 5A, for example, the lesson text 510 may contain at least one word block formatted in a different style, font, or color from other lesson words in the lesson text. The at least one word block may consist of a plurality of adjacent words selected from the lesson words. This plurality of adjacent words is not randomly chosen but, rather, is represents a collocation. Collocations generally are words that are commonly found together in the target language. It is believed that this special formatting of the at least one word block enhances imaginative memory of the learner and facilitates a direct neurological wiring and mental word association after multiple repetitions of the at least one word block during Concurrent Triple Activity.

Figure 5B:
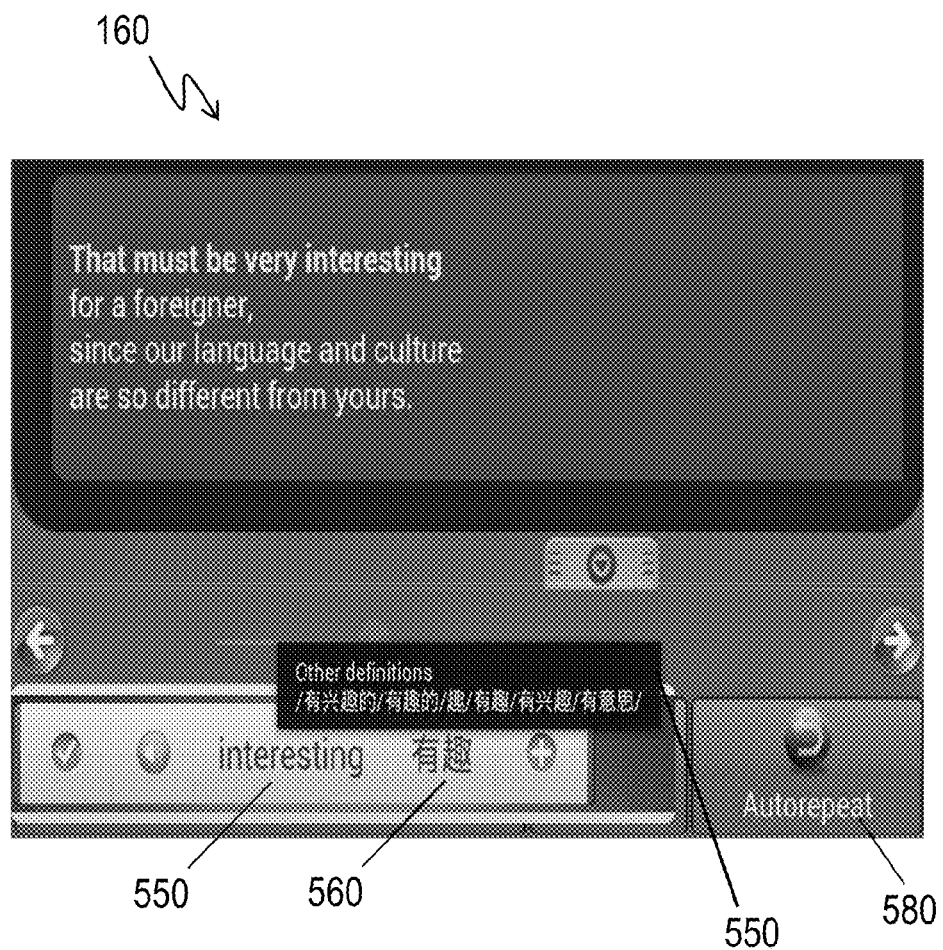
FIG. 5B is a portion of the display of FIG. 5A, in which all dictionary definitions of an individual word is are displayed in addition to the context-specific translation.

The context-specific translation 560 is particularly useful in this situation, because the word "interesting" may have numerous dictionary definitions, but only one of the dictionary definitions may actually fit the context of the word used in the lesson text 510 shown on the display 160. Nevertheless, if the learner is curious, the learner may select an expand button 540, for example, to result in a display 160 showing all the dictionary meanings 550 available for the word "interesting" in Chinese, as shown in FIG. 5B, for which five definitions are provided in addition to the one context-specific definition 560. It is believed that context-specific translations may resolve the problem of cross-translation between native and target language that is responsible for difficulties in acquiring a foreign language, because hearing the word in the target language and seeing its context-specific translation automatically forms a direct link between the target-language word and its image or situation which it describes.

Referring still to FIGS. 5A and 5B, in some embodiments, when the learner selects an individual lesson word 520, the context-specific translation 550 may be shown and then two recordings of the individual lesson word 520 stored in the word database, for example, may be played on the audio output. One of the two recordings may be of a male voice speaking the individual lesson word, and the other of the two recordings may be of a female voice speaking the individual lesson word. In some embodiments, the recording of the male voice may be played before the recording of the female voice. In other embodiments, the recording of the female voice may be played before the recording of the male voice. Then, the method may further include instructing the learner to replay at least one of the recordings at least once, for example from 5 to 10 times, while imitating the recording such as by speech shadowing, for example. As in the embodiments of the display 160 of FIGS. 5A and 5B, a speaker button 570 may be provided to enable the learner to play the recording once, and optionally an autorepeat button 580 may be provided to enable the learner to continue to repeat the recording as many times as desired while shadowing the speech of the recording.

In some embodiments, the computer-based applications described herein may be used to facilitate the RLR process and various methods for learning foreign language that include the RLR process as a component.

In some embodiments, computed-based applications may include one or more speech scoring engines to provide the learner with feedback on individual words or phrases recorded during the RLR process or the performance of CTA. Recorded speech may be scored on a paragraph level or on a word level, for example. Scoring on a paragraph level may include parsing recorded speech from the learner and from the pre-recorded lessons into word blocks of single words, then comparing the word blocks with a suitable sound wave analyzer software package to derive a comparison score for each word block. Based on a percentage match between sound images of the learner and the pre-recorded lesson, a color scheme such as green for perfect, yellow for satisfactory, red for mispronounced or not pronounced may be used. An average score may be computed for an entire paragraph based on the comparison scores for every word in the paragraph. Scoring on a word level, then, may simply involve a basic comparison of single word blocks from the sound images.

In some embodiments, computed-based applications may include computational algorithms for assessing speech fluency and providing feedback to the learner. Knowing that an average American English speaker engaged in a friendly conversation speaks at a rate of approximately 110-150 words per minute, it may be assumed, for example, that a fluent speaker of English as a Foreign Language will produce approximately 90 words per minute, or about 15 words per every 10 seconds. When drills such as Drill 10 (described above) are performed, the learner may record two or three sentences for evaluation. A sound image from this recording may be analyzed to determine both the number of words in the sentences and the total duration of the recording. For example, in a particular drill if a learner is provided ten lesson words and produces 23 sentences using the ten words, the learner may have said a total number of 180 words, and the duration of the recording may have been 115 seconds. A fluency number in this experimental case would be is 15.6 words per 10 seconds (180/115×10=15.6). Results from testing active vocabulary for fluency may be graphically indicated on the display. For example, a score of 15 or above may indicate strong fluency; a score of 12 to 15 may indicate less than optimal fluency; a score of 9 to 12 may indicate need for improvement; and a score of less than 9 may indicate high need for additional lessons.

After completion of multiple lessons, the learner may be ready to undertake a major testing by preparing sentences from up to 30 different words from previous lessons. In this case along with the fluency number, an active vocabulary number may be calculated as the number of words for which sentences were created and recorded divided by the total number of words shown on the display during testing. This number is equal to 1.0 if the learner created sentences for all tested words. If out of the total number of tested 30 words the learner has created sentences only for 24 words, his active vocabulary number is 0.8. A Word Cloud for the major testing may be based on all words from the previous lessons. On this ground the active vocabulary number becomes a good statistical descriptor of learner's success in acquiring active vocabulary. It is believed that by this measure, successful learners typically have an active vocabulary number in the range of 0.7 to 0.9, whereas some superior learners may consistently attain vocabulary numbers in the range of 0.9 to 1.0.

In some embodiments, the computer-based applications may comprise voice passwords and may include methods for developing a voice-activated user authentication. Generally, the voice passwords may comprise passwords spoken by users and stored as speech models in a database. The voice password entered by the user to obtain access then may be compared with the user's own speech models and with selected reference voice speech models to determine a measure of similarity. The validity of the password may be determined based upon this measure of similarity determined by software.

In some embodiments, a voice-activated authentication system may comprise a secure method of authentication that recognizes a person's unique speech patterns and identifies their voice as their password. With such a system, the user does not need to remember anything or select a specific password; instead, the user can choose this method of authentication once the system has built a database of the user's speech, based on his responses in the course of English training using the proposed method of Reverse Language Resonance.

The method and system of voice recognition for secure login procedure in an RIA does not require downloading of software to the RIA and may include one or more of the following features. In one embodiment, the system of voice recognition is activated only for subscribed users and its main objective may be to ensure secure login to the web server and to eliminate sharing of the RIA with unauthorized users. The system of voice recognition starts working not from the very first login, but only after a certain number of lessons have been completed by learner, for example, when all studied lessons account for a personal database of 500 words. In some embodiments, when the user has completed a certain number of lessons, the option of logging in by pronouncing a phrase selected randomly from the personal database from the individual voice recognition system may be made available on the login screen.

The final recording of each completed lesson made by a learner before the user starts working on the next lesson may be uploaded to a personal user page on the web server along with the corresponding text of the lesson. This recording and the text may be used for creation of the individual voice recognition system, as described above. In some embodiments, the system of voice recognition may be a separate module of individual voice recognition system that is designed for selecting word blocks from the lessons completed by the user, along with respective audio images to be used as the user's secure password. A selected word block then may be shown in a window dedicated to the system of voice recognition. To illustrate, the phrase: "Dinner discussion is like a forum that must be very interesting for a foreigner . . . " may be taken from the learner's recording of the previous lesson, and the learner may be instructed to pronounce this phrase during login.

The system of voice recognition then may compare the audio image of the pronounced word block to the respective audio image in the personal data base. Then, the system may perform a similarity measure of the two audio images in the personal database with the audio image recorded during login procedure to determine whether to allow access to the web server and/or PC or multimedia device. In some embodiments, the similarity measure may be shown on the display as feedback before a learner starts working on a new lesson. If similarity is below a predetermined value, for example 50%, a learner may be instructed to repeat work on the previous lesson. In this regard, a low similarity value is not used for rejection of the user's login; however, when a similarity below a certain predetermined level is attained after two or three consecutive login attempts, for example, the system may require additional means of verifying the user's identity. In one illustrative embodiment, the additional means may comprise sending a control code to the registered phone number of the user and requiring the user to enter the code in a displayed registration window or to answer additional security questions created in the original sign-up procedure.

Thus, in some embodiments of the methods for instructing a foreign language, the methods may include deriving a sound image from the learner's repetition of the spoken words into the audio input. Then, the sound image from the learner's repetition may be compared with a recording image of the recorded version of the spoken text. Then, a degree of similarity of the sound image and the recording image may be determined, such as by waveform comparison. Then, the degree of similarity may be displayed on the display to provide feedback to the learner.

In some embodiments of the methods for instructing a foreign language, the methods may include deriving a sound image from the learner's repetition of the spoken words into the audio input, then parsing the sound image into individual repeated words. The recording image of the recorded version of the spoken text also may be parsed into individual recorded words. Then, word-level degrees of similarity between each of the individual repeated words and corresponding individual recorded words may be determined. Once the word-level degrees of similarity are determined, they may be displayed on the display in a useful configuration. In one example configuration, the spoken words repeated by the learner may be displayed such that the spoken words are formatted word-by-word, such as with a color scale, for example, to represent the word-level degree of similarity of each individual repeated word to the corresponding individual recorded word. In some embodiments, the learner to repeat the Concurrent Triple Activity until at least of a majority of all the word-level degrees of similarity are at or above 70%, above 80%, above 90%, or even at 100%.

The accuracy of the system of voice recognition may increase with the time a user spends on training a foreign language with the RLR application, because the data base accumulates and averages all audio images of words and word blocks in the database with every additional lesson completed by the user. In some embodiments, the system of voice recognition may be designed in such a way that it could be used for login to any web site, not only to sites pertaining to the RLR process or associated application.

In some embodiments, the function of the system of voice recognition is closely associated with the Individual Voice Recognition component of the RIA. The system of voice recognition also has extended modality or functionality and could be used outside of RIA for creating the Individual voice recognition system in a native language or other languages, in which customers already speak fluently.

In such embodiments, customers may participate in creation of database of texts and their respective audio images whenever they choose to read texts aloud that represent for them special interest or inspiration. This cumulative training of extended version of the system of voice recognition in native or other languages may be performed until the database of accumulated words and word blocks reaches a predetermined number, for example, 2000 words. At this point the extended version of the system of voice recognition could be utilized for voice-to-text technology applications and for the system of voice recognition secure login to web sites, PC, tablets, and multimedia personal devices.

The cumulative training of the system of voice recognition by learners in English as a foreign language or in a native language or in any other languages which learners happen to speak fluently can be performed unobtrusively when learners are engaged in useful or pleasant to them activities: reading and speaking. When the similarity of pronounced phrase and one stored in the personal audio database reaches a certain level, for example above 90%, the system of voice recognition could be used for secure login. In some embodiments, the system of voice recognition may be created on a web server that has implemented OpenID standard and can be used for signing on to any web site which accepts OpenID authentication.

In some embodiments, methods of instructing a foreign language as a skill on subconscious and conscious levels may include a subconscious component of learning enhanced by adding a semi quantitative audio feedback. The method comprises web-based software or multimedia device application having a built-in capability of comparing two audio curves and measuring the similarity between the original recording of the lesson text and the learner's recording of the same created during learning session. The similarity between the original recording and the learner's recording created during learning session is measured semi quantitatively; the latter measurement is translated into a visual and/or audible readout on a PC or multimedia device display. The positive audio feedback is given to a learner when said similarity displayed on a screen of a PC or multimedia personal device turns into positive green GO (to the next lesson) sign or audio sign (for example, "you may go to the next lesson") on reaching a predetermined value of similarity, for example, 70 relative percent of similarity. When a learner receives audio feedback during work on the lessons using web-based software or multimedia personal devices, the learner's ability to improve pronunciation and spontaneous acquisition is dramatically improved despite not being consciously aware of the importance of audio feedback.

Unless otherwise defined, all technical and scientific terms used herein have the same meaning as commonly understood by one of ordinary skill in the art to which the described subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms such as "preferably," "commonly," and "typically" are not utilized herein to limit the scope of the claims or to imply that certain features are critical, essential, or even important to the structure or function of the claimed subject matter. Rather, these terms are intended merely to highlight alternative or additional features that may or may not be utilized in a particular embodiment.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of Reverse Language Resonance for instructing a target language to a learner who speaks a native language, the method comprising:
   providing to the learner a predetermined lesson comprising a lesson text of a plurality of lesson words that are exclusively in the target language;
   priming implicit memory of the learner by:
      playing through an audio output associated with a computer, a personal device, or a multimedia device a relaxation music to stimulate alpha/theta-wave activity in the learner's brain and induce in the learner a state of relaxation; and
      displaying on a display associated with the computer, the personal device, or the multimedia device a word cloud of a plurality of cloud words randomly selected from the lesson words, the cloud words in the word cloud being displayed in a three-dimensional font and having multiple three-dimensional orientations;
   listening, by the learner, to the relaxation music for at least 60 seconds;
   viewing, by the learner, of the word cloud while listening to the relaxation music;
   displaying the lesson text on the display after priming implicit memory of the learner;
   playing a recorded version of spoken words of the lesson text on the audio output while the lesson text is displayed;
   performing, by the learner, a Concurrent Triple Activity while the lesson text is displayed on the display and the recorded version is played on the audio output, the Concurrent Triple Activity comprising simultaneously reading, by the learner, of the lesson text on the display, listening, by the learner, to the recorded version from the audio output, and repeating aloud, by the learner, the spoken words along with the recorded version into an audio input associated with the computer, the personal device, or the multimedia device while the recorded version is playing;
   deriving a sound image from the learner's repetition of the spoken words into the audio input;
   comparing the sound image from the learner's repetition with a recording image derived from the recorded version;
   determining a degree of similarity of the sound image and the recording image;
   displaying the degree of similarity on the display to provide feedback to the learner; and
   repeating, by the learner, the Concurrent Triple Activity until the degree of similarity indicated on the display is at least 70%.

2. The method of claim 1, wherein:
   the word cloud contains at least three different colors of cloud words.

3. The method of claim 1, further comprising:
   displaying a native-language version of the lesson text on the display after the priming of implicit memory and before displaying the lesson text on the display;
   reading, by the learner, of the native-language version of the lesson text silently while imagining a situation described in the lesson text; and
   reading, by the learner silently at least once before performing the Concurrent Triple Activity, the lesson text in the target language while listening to the recorded version of the spoken words of the lesson text on the audio output.

4. The method of claim 1, further comprising:
   highlighting at least one of the cloud words in the word cloud or dropping at least one of the cloud words from the word cloud; and
   speaking, by the learner, at least one sentence containing the highlighted or dropped cloud word into the audio input;
   deriving a sentence sound image from the sentence spoken into the audio input containing the at least one highlighted or dropped cloud word;
   determining a number of words contained in the sentence sound image;
   determining a speech time of the sentence sound image; and
   dividing the number of words by the speech time to determine fluency as a speech rate in words per minute.

5. The method of claim 4, further comprising:
   repeating at least once:
      highlighting an additional cloud word in the word cloud or dropping an additional cloud word from the word cloud;
      instructing the learner to speak at least one additional sentence containing the highlighted or dropped additional cloud word into the audio input;
      deriving an additional sentence sound image from the additional sentence spoken into the audio input containing the highlighted or dropped additional cloud word;

determining a number of words contained in the additional sentence sound image;

determining a speech time of the additional sentence sound image; and dividing the number of words in the additional sentence sound image by the speech time of the additional sentence sound image to determine fluency as a speech rate of the additional sentence sound image in words per minute;

averaging the speech rates of the sentence sound image and all the additional sentence sound images to determine a fluency score; and displaying the fluency score on the display to provide feedback to the learner.

6. The method of claim 1, wherein each lesson word of the lesson text displayed on the display is selectable by the learner, such that when the learner selects an individual lesson word, the method further comprises:

displaying on the display a context-specific translation of the individual lesson word in the native language;

playing on the audio output a recording of a male voice speaking the individual lesson word in the target language;

playing on the audio output a recording of a female voice speaking the individual lesson word in the target language;

instructing the learner to replay at least one of the recordings at least once while imitating the at least one of the recordings; and replaying, by the learner, of at least one of the recordings at least once while imitating the at least one of the recordings.

7. The method of claim 1, wherein the predetermined lesson further comprises a repetition drill, the method further comprising:

displaying a drill paragraph on the display after the learner performs the Concurrent Triple Activity, the drill paragraph comprising a plurality of the lesson words;

instructing the learner to speak the drill paragraph aloud multiple times at increasing speeds;

speaking aloud, by the learner, of the drill paragraph multiple times at increasing speeds;

redisplaying a portion of the drill paragraph as an incomplete paragraph missing at least three of the lesson words selected randomly from the drill paragraph;

instructing the learner to speak the incomplete paragraph aloud as quickly as possible as though the incomplete paragraph were the drill paragraph; and speaking aloud, by the learner, of the incomplete paragraph aloud as quickly as possible as though the incomplete paragraph were the drill paragraph.

8. The method of claim 7, further comprising:

redisplaying the drill paragraph as a garbled paragraph in which at least three of the lesson words selected randomly from the drill paragraph are misspelled such that at least a first letter and a last letter of each misspelled word are the same as if the misspelled word were not misspelled;

instructing the learner to speak the garbled paragraph aloud multiple times with increasing speed as though the garbled paragraph were the drill paragraph; and speaking aloud, by the learner, the garbled paragraph multiple times with increasing speed as though the garbled paragraph were the drill paragraph.

\* \* \* \* \*